INVENTOR
Gerhard Heyek
BY Watson, Cole, Grindle & Watson
ATTORNEYS

United States Patent Office 3,473,057
Patented Oct. 14, 1969

3,473,057
OSCILLATING MOTOR, PREFERABLY
FOR DRY SHAVERS
Gerhard Heyek, 61 Rosenberggasse,
Graz, Styria, Austria
Filed Aug. 7, 1967, Ser. No. 658,760
Claims priority, application Austria, Aug. 11, 1966,
7,695/66
Int. Cl. H02k 7/06
U.S. Cl. 310—21      3 Claims

ABSTRACT OF THE DISCLOSURE

A substantially U-shaped stator has two spaced apart free limb end portions. An oscillating armature system comprising an oscillating armature member and an output lever arm is pivotally connected by a mounting to one of said free limb end portions. Said mounting and said armature member are arranged so that said oscillating armature member enters the space between said two free limb end portions during its oscillating movement.

---

This invention relates to an oscillating motor, which is used to produce a reciprocating movement, particularly in dry shavers, but may also be employed in electric toothbrushes, massage appliances or similar small appliances.

In connection with a reciprocating motor of known type, in which a substantially U-shaped stator cooperates with an oscillating armature system, which has a lever arm acting on a driven member, it is an object of the invention so to design the oscillating motor that the overall design is as simple as possible and vibration is avoided as far as possible. This object is accomplished according to the invention in that the oscillating armature system is pivotally mounted close to the free end of one limb of the stator and this mounting and the configuration of the oscillating armature are designed so that the oscillating armature enters the space between the end portions of the two stator limbs during its oscillating movement. The two limbs of the U-shaped stator are substantially parallel to the direction of movement of the driven member and lie in a common plane with said member, and the oscillating armature is mounted at or near the free end of that stator limb which is adjacent to the driven member. In this arrangement, the moments due to the masses of the member which is driven by the lever arm and disposed on one side of that limb and of the armature extending toward the other stator limb can easily be balanced.

The armature is suitably mounted without friction by means of a torsion spring, which is secured to the stator and which may extend through the free limb end. A mounting without friction may also be obtained with the aid of a bending spring, which is secured to the stator. A resilient stop for limiting the amplitude is preferably provided at the free end of the other stator limb or in the air gap in which the armature is movable.

Embodiments of the invention will now be described more fully and by way of example with reference to the accompanying drawings, in which FIGS. 1a and 1b are, respectively, an end elevation and a side elevation showing diagrammatically a first embodiment.

Figure 1A:
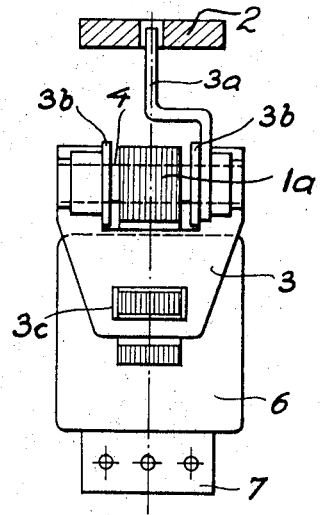
FIG. 1c is a transverse sectional view taken on line C—C in FIG. 1b and showing the torsion spring used for mounting the armature in this embodiment.
Figure 1B:
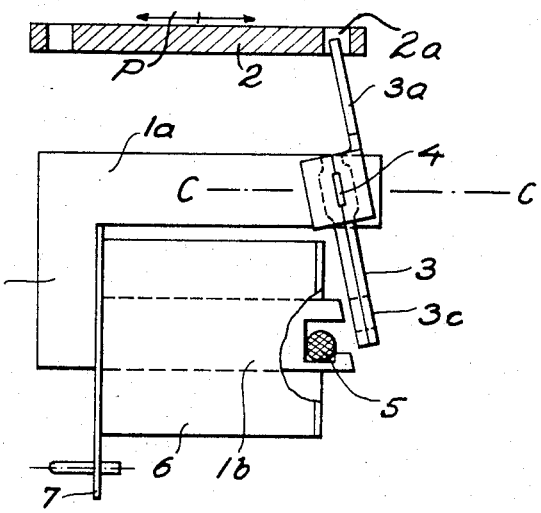

FIGS. 1a and 1b show a U-shaped ferromagnetic stator 1, which has horizontal limbs 1a and 1b, which extend parallel to the direction of the recirprocating movement of the implement to be driven. This direction of movement is indicated in FIG. 1b by a double arrow P. The driven member 2 is only diagrammatically indicated in the drawing because its design is of no significance for the nature of the invention. In a preferred application, the member 2 is the reciprocating lower blade of a dry shaver. That blade may cooperate with a curved shear blade.

Figure 1C:
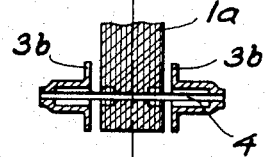

An oscillating armature 3 is pivotally mounted at the free end of the upper stator limb 1a and has a lever arm 3a, which extends into an aperture 2a of the driven member 2. This pivotal mounting is effected in the embodiment shown in FIGS. 1a to 1c by a torsion spring 4, which extends through the stator limb 1a and is held, e.g., against rotation in said stator limb as is shown in FIG. 1c.

The substantially platelike armature 3 is composed of two laminations, which have a recess at that end which faces the limb 1a. The end portion of the limb 1a extends into said recess. Flange portions 3b are bent from the laminations at right angles thereto and serve as pole pieces, which receive magnetic flux from the limb 1a. The flange portions 3b extend on opposite sides of the limb 1a and are joined, e.g., by spot welding. The two ends of the torsion spring 4 are clamped between said flange portions.

The armature 3 has at its free end a recess 3c, which can receive a portion of the split end of the other stator limb 1b when the armature enters between the end portions of the stator limbs 1a, 1b during its oscillating movement. The gap of the stator limb 1b contains a resilient stop, e.g., in the form of a round rubber buffer, for limiting the amplitude. The limb 1b of the stator carries an exciting coil 6, which is provided with a terminal board 7 for the electrical connections.

The material and the configuration of the lever arm 3a are selected so that this arm together with the mass of the driven member 2 substantially balances the moments which are due to the mass of the armature 3 disposed beyond the mounting which is formed by the torsion spring 4. This design is simple and affords substantially an absence of vibrations.

Figure 2A:
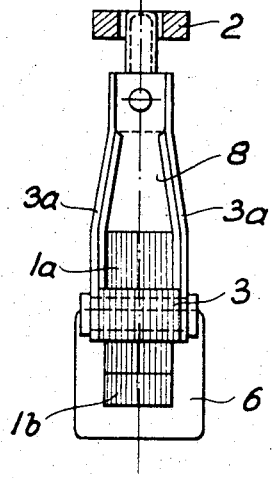
FIGS. 2a and 2b are, respectively, an end elevation and a side elevation showing a second embodiment.
Figure 2B:
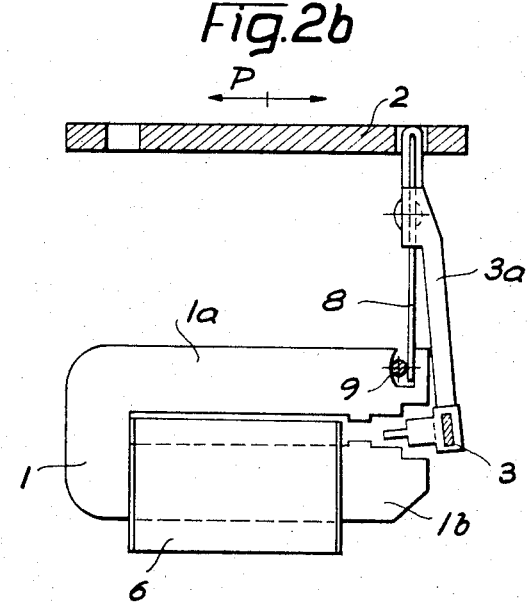

The embodiment shown in FIGS. 2a and 2b is generally similar to the previously described embodiment. For a friction-free mounting of the armature 3 and its lever arm 3a, a bending spring 8 is provided, which is secured near the free end of the stator limb 1a in a groove of the latter, e.g., with the aid of a clamping pin 9. The lever arm 3a is forked. The armature 3 is disposed between the free ends of the fork. At the end remote from its fork ends, the lever arm has an extension, which extends into the driven member 2. The oscillating armature system consisting of the armature 3 and the lever arm 3a is secured to the bending spring adjacent to the inner end of the fork, e.g., by a rivet.

As is apparent from FIG. 2b, the armature 3 and the space between the end portions of the two stator limbs 1a, 1b are stepped with respect to the direction of movement of the armature 3 so that the magnetic circuit is closed in conjunction with a smaller amplitude of the armature.

The friction free mountings which have been shown and comprise torsion or bending springs may be replaced by different mountings, such as bearing bushings of sintered iron.

What is claimed is:

1. An oscillating motor comprising a substantially U-shaped stator having two spaced apart free limb end portions, an oscillating lever having two arms extending substantially aligned in opposite directions, one arm of said lever bearing an armature member on its free end and the other arm of said lever serving as output arm, a bending spring secured to one of the free limb end portions and extending outwardly from the stator, said lever being supported at a point intermediate of the two arms, and said lever and said armature member being designed and arranged so that the armature member enters the space between said two free limb end portions during its oscillating movement.

2. An oscillating motor according to claim 1, in which said armature member fits entirely with a clearance into the space between said free limb end portions, and the lever arm bearing the armature member having free fork ends, and said armature member being secured between said fork ends.

3. An oscillating motor according to claim 1, in which said armature member and said free limb end portions have confronting surfaces which are stepped with respect to the direction of movement of the armature.

References Cited

UNITED STATES PATENTS

| | | | |
|---|---|---|---|
| 1,576,155 | 3/1926 | Stevens | 335—244 |
| 2,212,858 | 8/1940 | Eickemeyer | 310—47 |
| 2,344,178 | 3/1944 | Sparrow | 317—135 |
| 2,764,703 | 9/1956 | Anton | 310—17 |
| 3,010,036 | 11/1961 | Wahl | 310—29 |
| 3,109,194 | 11/1963 | Hay | 16—75 |

MILTON O. HIRSHFIELD, Primary Examiner

L. A. ROUSE, Assistant Examiner